Aug. 30, 1927.
R. W. YOUNG
TURNTABLE TRACTOR
Filed Sept. 8, 1924
1,640,389
2 Sheets-Sheet 1
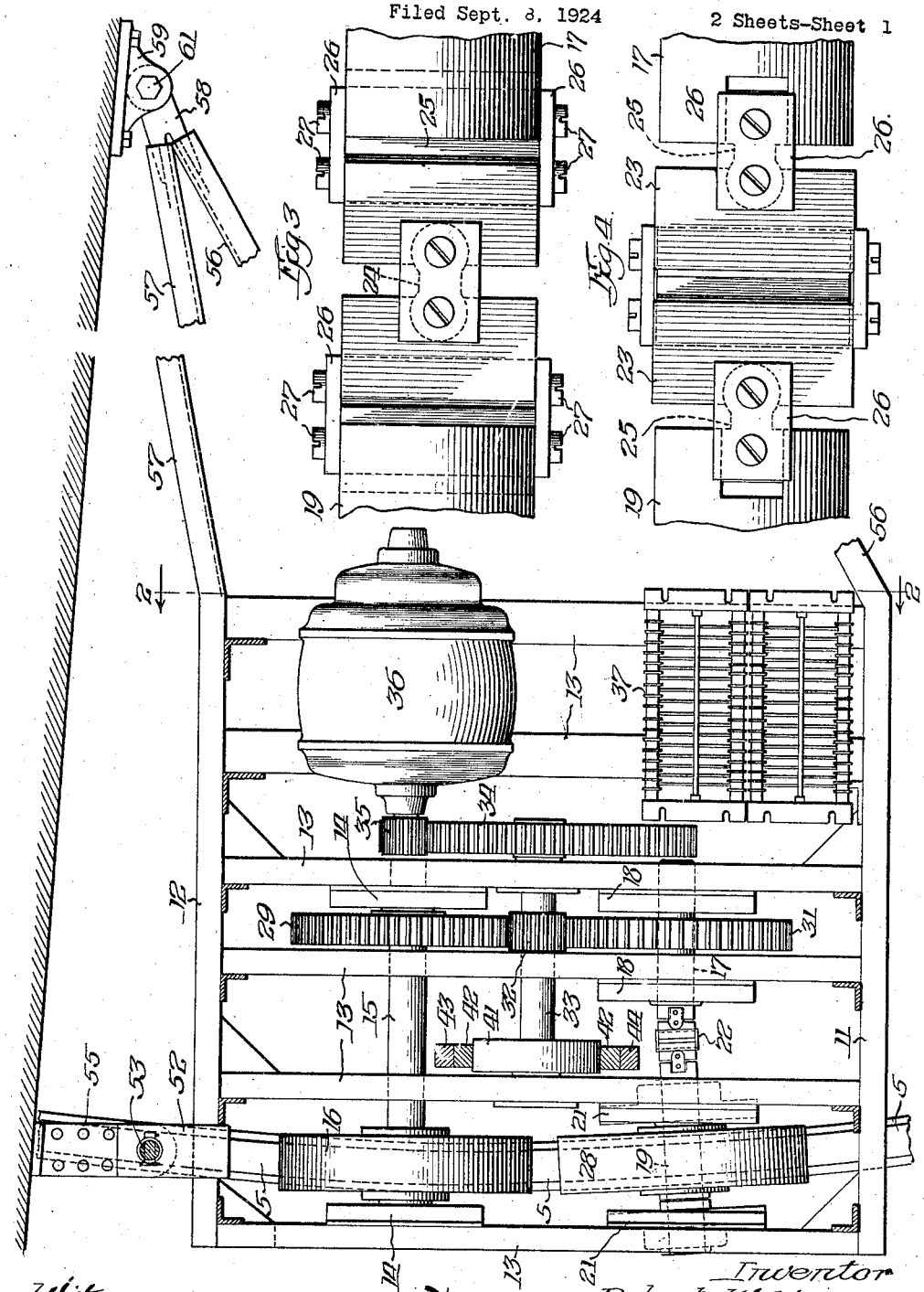
Witness:
Inventor
Robert W. Young
By Ira J. Wilson Atty.

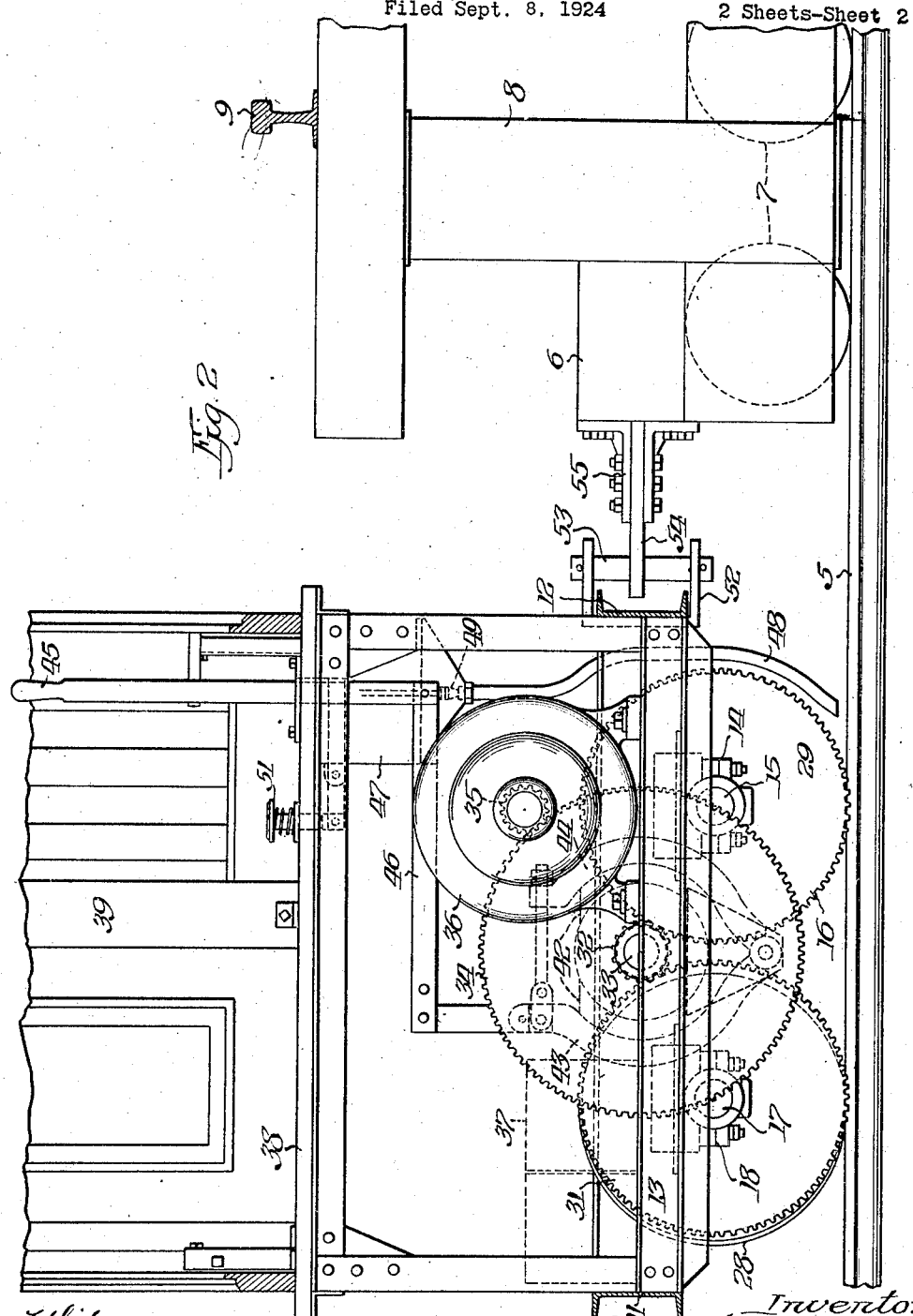

Patented Aug. 30, 1927.

1,640,389

UNITED STATES PATENT OFFICE.

ROBERT W. YOUNG, OF WILMETTE, ILLINOIS.

TURNTABLE TRACTOR.

Application filed September 8, 1924. Serial No. 736,418.

This invention pertains in general to traction apparatus, and has reference more particularly to a tractor adapted to travel upon the circle rail of a turntable and to propel a turntable of the heavy, locomotive carrying type.

More specifically, my present invention is in the nature of an improvement upon the turntable tractor forming the subject-matter of Letters Patent No. 1,480,038 granted to me January 8, 1924. In the said Letters Patent I have disclosed and claimed a turntable tractor characterized by the provision of a truck frame flexibly connected to the turntable and carrying a motor, a pair of supporting and driving wheels mounted tandem in said truck and traveling upon the track rail of the turntable, and transmission mechanism from the motor to said wheels. In the apparatus disclosed in said Letters Patent the wheels are fast on parallel axles, the axes of which are parallel with each other and with a radius of the track disposed between the axles. The result is that in the operation of the tractor the wheels always travel along a path that is not exactly coincident with the fixed path of the circle rail but at a slight angle thereto.

The main object of the present invention is to provide a construction retaining the advantages of the multiple wheel traction and at the same time having the axles radially disposed so that both wheels travel in a path exactly coincident with the circle rail. Another and more specific object is to provide an improved construction possessing the advantage last-mentioned, and also permitting the use of ordinary spur gearing between the motor and both traction wheels, and not requiring the use of bevel or other specially formed gearing such as would be required to transmit power from a single motor shaft to two driven shafts at an angle to each other.

In many structural details, my invention preferably follows the disclosure of my aforesaid Letters Patent, but it will be understood that, so far as my present improvements are concerned, they are functionally independent of many of the features shown and claimed in said Letters Patent such, for instance, as the flexible connection from the tractor to the turntable by which the jolts and vibrations of the latter are not transmitted to the tractor, the double connection of the tractor to the turntable, the brake mechanism, etc.

Referring to the drawings;

Fig. 1 is a plan view, with the cab removed, of a tractor embodying my invention;

Fig. 2 is a side elevation of the tractor and turntable, partly in section, on the line 2—2 of Fig. 1;

Fig. 3 is an enlarged plan view of a universal joint coupling preferably employed to connect the sections of one of the wheel axles; and Fig. 4 is a view similar to Fig. 3 showing the coupling turned through an angle of 90°.

Referring to the drawings, 5 indicates the circle rail of a turntable upon which the turntable proper is adapted to travel. Such turntable, which may be of any preferred construction, is illustrated somewhat diagrammatically, reference numeral 6 indicating one of the radial members of the structure, 7 the carrying wheels, 8 a supporting member, and 9 one of the rails upon which the locomotive or car to be turned is supported.

The tractor comprises a main or truck frame consisting of front and rear frame members 11 and 12 connected by a series of cross members 13, all rigidly secured together by suitable angles, gusset plates, and braces, if desired. Journaled in bearings 14 is a wheel axle 15, the axis of which lies substantially coincident with a radius of the track 5; and fast on this axle is a supporting and driving wheel 16. Also journaled in the truck frame in advance of the axle 15 is a second wheel axle comprising an inner section 17 journaled in bearings 18 and disposed parallel with the axle 15, and an outer section 19 journaled in bearings 21 and disposed at a slight angle to the section 17 and substantially axially coincident with another radius of the track 5. The opposed ends of the axle sections 17 and 19 are connected by a universal joint coupling designated as an entirety in Fig. 1 by 22. Figs. 3 and 4 illustrate in detail one practical form of such universal coupling, but it is to be understood that any suitable or preferred coupling of this type may be employed, and the present invention is not concerned with the particular details of such coupling. The coupling herein shown, however, comprises a pair of blocks 23 having their opposed faces transversely recessed or slotted to form seats for a knuckle 24 of dumb-bell shape in cross-section, and a pair of similar knuckles 25 engaged with corresponding slots or seats in the opposed ends of the shaft section 17 and one of the blocks 23 and of the shaft section 19 and the other block 23, said knuckles 25 lying at right angles to the knuckle 24. The knuckles are retained in place by plates 26 secured to the ends thereof by screws 27, said plates overlapping the proximate ends of the shaft sections and the intermediate coupling blocks.

Fast on the axle section 19 is a supporting and driving wheel 28 which, it will be observed from Fig. 1, lies in a vertical plane slightly inclined to the vertical plane of the wheel 16 and normal to the radius of the track that coincides with its axis of rotation. Hence, during the travel of the tractor on the circle rail the tread of the wheels on the rail is along a line coincident with the longitudinal axis of the rail.

The mechanism for driving the wheels, which is substantially the same as that disclosed in my former Letters Patent above referred to, comprises a pair of spur gears 29 and 31 fixed upon the shaft 15 and the shaft section 17, respectively, and driven by a common driving pinion 32 mounted on a shaft 33 which is provided at one end with a spur gear 34 meshing with and driven by a pinion 35 carried by the driving shaft of a motor 36 suitably mounted on the frame. For illustrative purposes I have shown an electric motor of standard construction, but any other type of motor, such as a gas engine, a compressed air motor, or any other preferred type may be employed. At 37 I have shown the motor controller mounted on the frame structure in proximity to the motor and beneath the floor 38 of the operator's cab 39, which is located directly over the driving mechanism.

Upon the shaft 33 there is mounted a brake drum 41 adapted to be engaged by the wooden brake shoes 42 carried respectively by the brake beams 43 and 44, and adapted to be actuated by the operator through a brake lever 45 connected by a link 46 with the brake beams 43 and 44. A sand box 47 is mounted on the frame beneath the floor of the cab and is equipped with a discharge pipe 48 controlled by a valve 49, which is actuated by the operator through a foot pedal 51. The rear frame member 12 of the truck is equipped with a rearwardly projecting bifurcated coupling bracket 52 adapted to receive a coupling pin 53 which passes through a link 54, in turn rigidly secured by bracket members 55 to the frame structure of the turntable proper. It will be observed from Fig. 2 that the space between the bifurcations of the coupling bracket 52 permits a considerable range of vertical movement of the link 54 without transmitting such movement to the tractor, and the parts are so designed that the maximum vertical movements of the turntable will be thus accommodated without imparting any such movements to the tractor.

The tractor is also connected to the turntable structure at a point inwardly of the connection last-described through a laterally extending bracket or frame extension, substantially triangular in shape, and conveniently formed by extending the main frame members 11 and 12 inwardly to provide the extension members 56 and 57. These members are connected at their juncture at the apex of the triangle by a member 58 adapted to loosely fit between the ears of a bracket 59 bolted to the turntable structure, this member being pivotally connected to the bracket by a bolt 61. This frame extension thus holds the tractor in proper radial position with the traction wheels disposed upon the circle rail, and also holds the tractor in upright position against sidewise tilting movements.

In common with the tractor disclosed and claimed in my aforesaid Letters Patent, my present improved tractor is a structurally independent unit which may be readily attached to any turntable. It is self-balancing by reason of the two traction and supporting wheels so that it has no tendency to tilt forwardly or backwardly, and it is capable of exerting a maximum tractive effort by reason of the application of power to both wheels. The loose, flexible connection between the tractor and the outer end of the turntable permits the latter to move vertically under the influence of the weight imposed thereon without imparting any of such movements to the tractor, with the result that the mechanism and electrical equipment of the tractor are not injured or disturbed by the movements of the turntable nor is the operator subjected to inconvenience of a violently tilting cab, as he often is in a single wheel tractor. In addition to the foregoing advantages, my present invention provides a two wheel tractor wherein both wheels turn on axes of rotation that are substantially coincident with radii of the circle rail on which the wheels travel, thereby avoiding slippage of the wheels on the rail during travel and obviating the friction and wear consequent upon such slippage.

While I have shown and described a preferred embodiment of the invention, manifestly the details of construction are capable of considerable modification without departing from the spirit of the invention; and hence I reserve all such variations and modifications as fall within the spirit and purview of the appended claims.

I claim—

1. In a turntable tractor, the combination of a truck frame, a pair of wheel axles journaled in said frame, one of said axles being sectional with a universal joint coupling connecting the sections thereof, supporting and driving wheels fast on said axles and disposed tandem, a motor mounted on said frame, and transmission mechanism between said motor and said axles.

2. In a turntable tractor, the combination of a truck frame, a wheel axle journaled in said frame with its axis substantially coincident with a radius of the turntable track, a second wheel axle having an inner section journaled in said frame parallel with said first-named axle and an outer section journaled in said frame with its axis substantially coincident with another radius of the turntable track, a universal joint coupling connecting the opposed ends of said axle sections, supporting and driving wheels fast on said first-named axle and the outer section of said second axle, a motor mounted on said frame, and transmission mechanism between said motor and said first-named axle and the inner section of said second axle.

3. In a turntable tractor, the combination of a truck frame, a wheel axle journaled in said frame with its axis substantially coincident with a radius of the turntable track, a second wheel axle having an inner section journaled in said frame parallel with said first-named axle and an outer section journaled in said frame with its axis substantially coincident with another radius of the turntable track, a universal joint coupling connecting the opposed ends of said axle sections, supporting and driving wheels fast on said first-named axle and the outer section of said second axle, an electric motor mounted on said frame, and a spur gear transmission train between the shaft of said motor and said first-named axle and the inner section of said second axle.

ROBERT W. YOUNG.